(12) United States Patent
Guitoneau

(10) Patent No.: US 6,595,560 B1
(45) Date of Patent: Jul. 22, 2003

(54) SLEEVE JOINT

(75) Inventor: Hans Edward Guitoneau, Grootebroek (NL)

(73) Assignee: Pipelife Nederlande B.V., Enkhuizen (NL)

( * ) Notice: Subject to any disclaimer, the term of this patent is extended or adjusted under 35 U.S.C. 154(b) by 0 days.

(21) Appl. No.: 09/763,252

(22) PCT Filed: Aug. 19, 1999

(86) PCT No.: PCT/NL99/00522

§ 371 (c)(1), (2), (4) Date: Feb. 20, 2001

(87) PCT Pub. No.: WO00/11390

PCT Pub. Date: Mar. 2, 2000

(30) Foreign Application Priority Data

Aug. 19, 1998 (NL) .............................................. 1009898

(51) Int. Cl.[7] ........................... F16L 13/04; F16L 35/00
(52) U.S. Cl. ........................ 289/114; 285/420; 285/339; 285/55
(58) Field of Search .................. 285/114, 420, 285/339, 337, 45, 55, 104

(56) References Cited

U.S. PATENT DOCUMENTS

| | | | | |
|---|---|---|---|---|
| 2,857,931 A | * | 10/1958 | Lawton | 285/55 |
| 3,552,192 A | * | 1/1971 | Smith | 73/583 |
| 3,628,814 A | * | 12/1971 | Hallwood | 277/605 |
| 3,687,487 A | | 8/1972 | Lindholm | |
| 4,109,941 A | * | 8/1978 | Wood et al. | 285/114 |
| 4,484,386 A | * | 11/1984 | Stonitsch | 156/245 |
| 4,640,531 A | * | 2/1987 | Forster et al. | 285/24 |
| 4,776,613 A | * | 10/1988 | Dickey et al. | 285/55 |
| 5,341,830 A | * | 8/1994 | Helmsderfer et al. | 137/15.08 |
| 5,468,025 A | * | 11/1995 | Adinolfe et al. | 285/114 |
| 6,065,782 A | * | 5/2000 | Allen, Jr. | 285/114 |

FOREIGN PATENT DOCUMENTS

| EP | 0438990 | 7/1991 |
|---|---|---|
| WO | WO9512086 | 5/1995 |

* cited by examiner

*Primary Examiner*—Lynne H. Browne
*Assistant Examiner*—Aaron M Dunwoody
(74) *Attorney, Agent, or Firm*—Handal & Morofsky

(57) ABSTRACT

Two pipe sections (1–4, 31, 32) of a high-pressure line each comprise a fluid-tight inner jacket (9) made of a thermoplastic material and a reinforced outer jacket (10). The innner jackets are attached to one another by means of a fluid-tight weld (5–8, 33) and the outer jackets are each connected to one another by means of a connecting sleeve (16, 17, 25, 26). The connecting sleeve comprises shells which have serrations (15, 27) on the inside, as well as clamping means (13, 14, 28–31) for clamping the shells on the pipe sections in such a way that the internal serrations (18, 27) are made to interact with the outer jackets of the pipe sections.

11 Claims, 2 Drawing Sheets

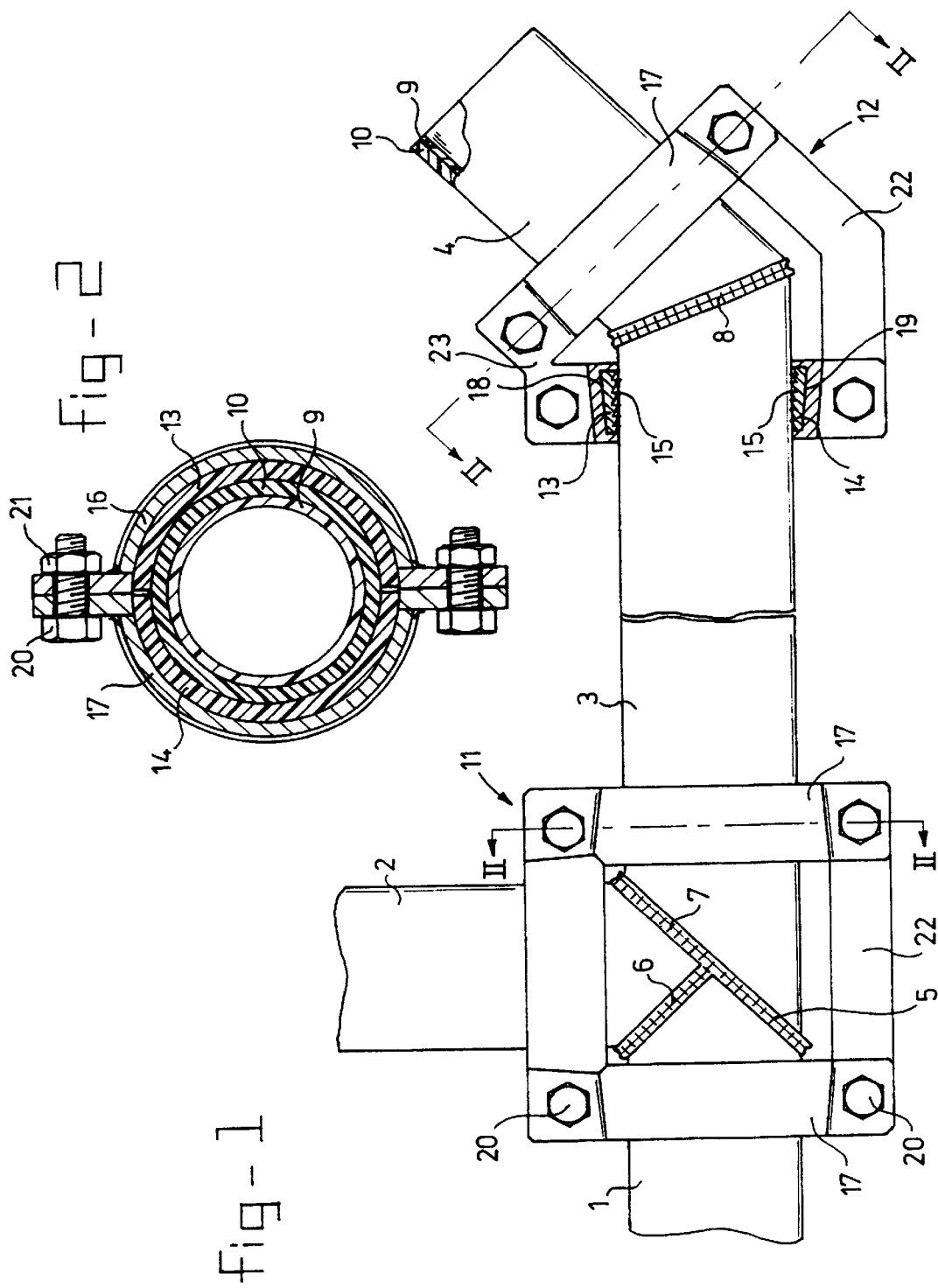

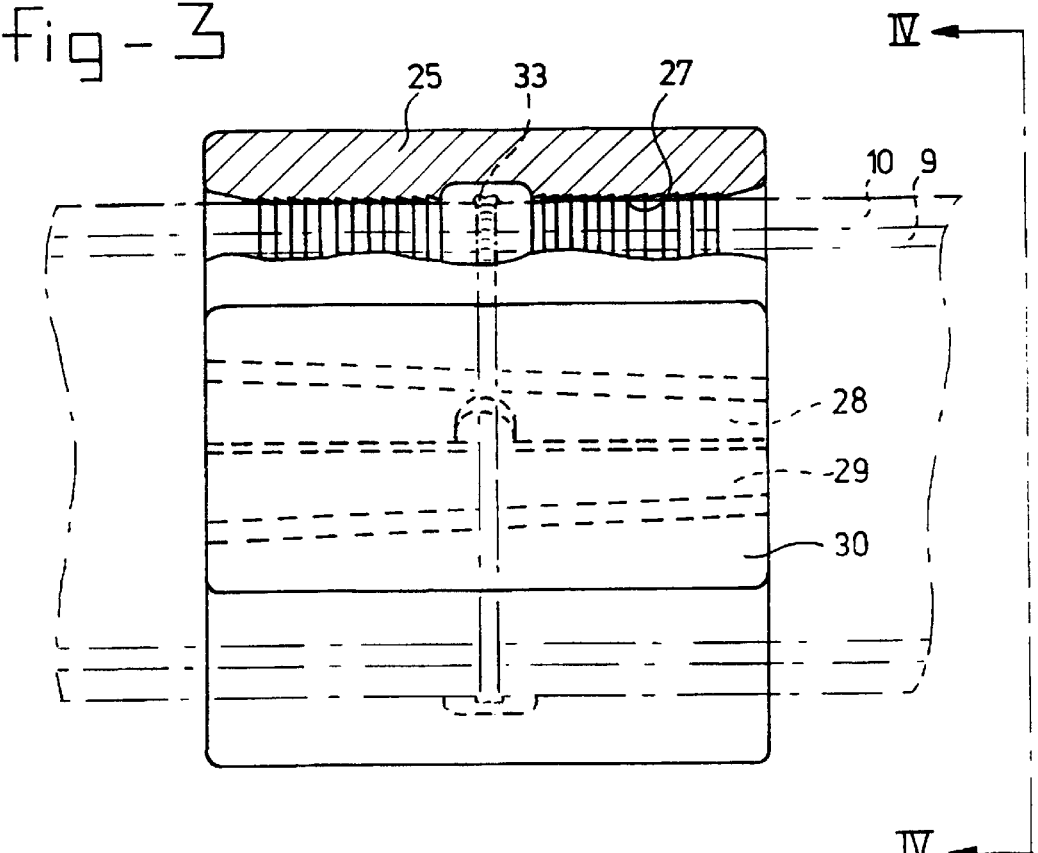
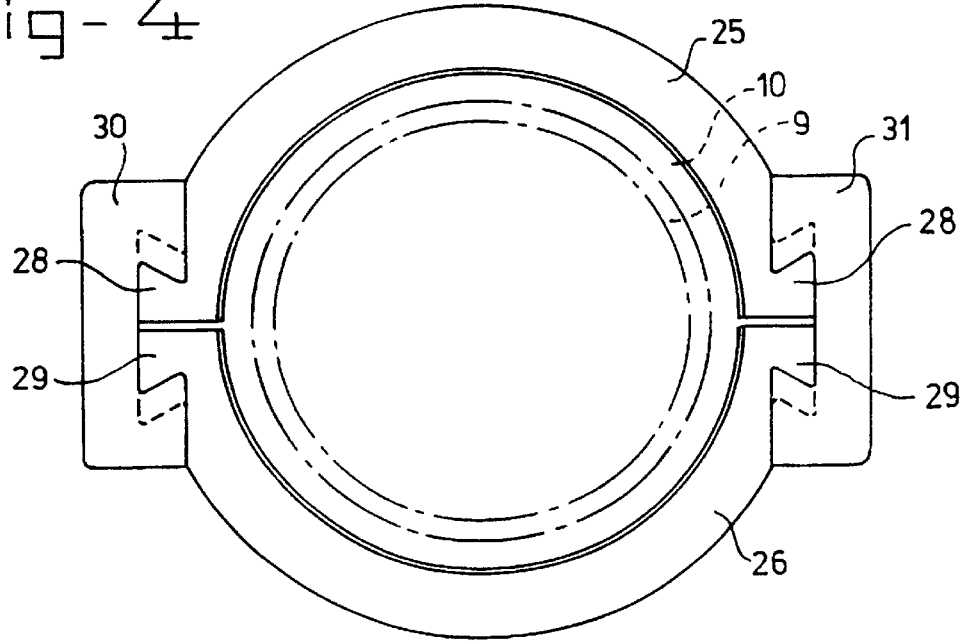

SLEEVE JOINT

BACKGROUND OF THE INVENTION

The invention relates to a sleeve joint between two pipe sections of a high-pressure line, which pipe sections each comprise a fluid-tight inner jacket made of a thermoplastic material and a reinforced outer jacket, the inner jackets being attached to one another by means of a fluid-tight weld and the outer jackets each being joined to one another by means of a connecting sleeve.

A sleeve joint of this type is disclosed in WO-A 9512086. With this known sleeve joint a bush-shaped sleeve is used, into which the ends of the pipe sections to be joined are inserted. Two conical rings are pressed onto the sleeve, which rings have to produce the clamping connection. With this arrangement the ends concerned are locally deformed as a consequence of rings provided on the interior surface of the sleeve.

BRIEF SUMMARY OF THE INVENTION

This known sleeve joint has various disadvantages. First of all the bush-shaped sleeve and the pipe sections have to be constructed to fit closely into one another such that the desired strength and tightness of the seal can actually be achieved in practice. Furthermore, the rings must be pressed onto the sleeve using fairly high forces, for which special tools are needed.

The aim of the invention is to provide a sleeve joint which does not have these disadvantages. Said aim is achieved in that the connecting sleeve comprises shells which have serrations on the inside, as well as clamping means for clamping the shells on the pipe sections in such a way that the internal serrations are made to interact with the outer jackets of the pipe sections.

The shells can be slid fairly easily laterally onto the ends of the pipe sections to be connected, after which the clamping means can be tightened.

To ensure the desired retaining action, the serrations can be barb-shaped and located in two regions, the barbs in the one region being oriented in the opposite direction to those in the other region.

The serrations are forced into the external surface of the pipe sections on tightening the clamping means, as a result of which said external surface is locally compressed somewhat. The surface of the pipe sections does not have to be specially prepared, whilst a firm joint can nevertheless be obtained.

According to a first possibility, two shells are provided, each of which extends over both pipe sections.

Both shells can have wedge-shaped external clamping surfaces which interact with clamping pieces which are provided on the inside with corresponding wedge-shaped clamping surfaces and can be slid in the axial direction onto the clamping surfaces of the shells.

According to a second possibility, each pipe section can be fitted with a pair of shells, which pairs are joined to one another by means of a yoke.

In this case, each pair of shells is clamped on the relevant pipe section by means of a clamping bracket surrounding said pair, a tensile element being fixed to said clamping brackets of the two pairs.

Each clamping bracket has a recess which extends all round and in which the pair of shells is accommodated.

By way of example, each clamping bracket can comprise two identical clamping bracket halves, in each of which one shell is accommodated.

Reference is made to the sleeve joint as disclosed in EP-A 152 752. With said known sleeve joint a sleeve comprising two shell halves is used. Both the shell halves and the pipe sections are provided on those surfaces thereof that face one another with a sinusoidal ring pattern which is intended to ensure good force transfer.

BRIEF DESCRIPTION OF THE DRAWINGS

The disadvantage of this known sleeve joint is that the ends of the pipe sections that are joined must be pre-matched to provide the sinusoidal ring pattern.

FIG. 1 shows a first embodiment of the sleeve joint according to the invention.

FIG. 2 shows a cross-section in accordance with II—II in FIG. 1.

FIG. 3 shows an axial section of a second embodiment.

FIG. 4 shows a cross-section on the line IV—IV of FIG. 3.

DETAILED DESCRIPTION OF THE INVENTION

The sleeve joints between the pipe sections 1, 2, 3 and 4 in FIGS. 1 and 2 firstly comprise welded joints 5, 6, 7 and 8 between the respective fluid-tight inner jackets 9.

The T-joint between the pipe sections 1, 2 and 3 further comprises a joint 11 between the respective outer jackets 10. The 45° elbow joint between the pipe sections 3 and 4 comprises a joint 12 between the outer jackets 10. Other joints, for example at different angles or between more than three pipe sections, are not shown but explicitly are amongst the possible options.

Each of the joints 11, 12 comprises at least two shells 13, 14, provided with internal inclined serrations 15. The shells 13, 14 are accommodated in clamping,bracket halves 16, 17, each of which defines a recess 18, 19 which extends all round and into which the shells 13, 14 fit closely.

The clamping bracket halves 16, 17 are clamped to one another by means of bolts 20 and nuts 21, the serrations 15 penetrating into the external surface of the outer jackets 10.

The clamping bracket halves 16, 17 are connected to one another by tensile strips 22, The variant in FIGS. 3 and 4 comprises two shells 25, 26 on either side of a weld 33, each having sets of serrations 27 (one referenced) facing one another.

The shells 25, 26 have wedge-shaped external clamping surfaces 28, 29, which interact with clamping pieces 30, 31 provided on the inside with corresponding wedge-shaped clamping surfaces.

What is claimed is:
1. A sleeve joint for connecting together two pipe sections of a high-pressure line, each pipe section comprising a fluid-tight inner jacket of a thermoplastic material and a reinforcing outer jacket, the two inner jackets being joined to one another by a fluid-tight weld, and the two outer jackets being joined to one another by the sleeve joint to provide continuous reinforcement along the pipe, the sleeve joint comprising:
   a) a two pairs of separable shells, one pair for each pipe section, each shell of each pair having an inner surface and having serrations on the inner surface to engage with the respective pipe section outer jacket;

b) a clamp for each pair of shells to extend around and clamp the respective pair of shells so that the shell serrations to can grippingly engage the respective pipe section outer jacket; and c) at least one tensile element extending between and secured to each pair of clamped shells.

2. A sleeve joint according to claim 1 wherein the serrations are inclined, the serrations on one pair of shells being inclined in opposition to the serrations on the other pair of shells, to resist separation of the outer jackets.

3. A sleeve joint according to claim 1 wherein each clamp extends around and has a recess to accommodate the respective pair of shells.

4. A sleeve joint according to claim 3 wherein each clamp comprises a pair of clamping brackets, optionally bracket halves, one for each shell of the pair and a fastening device, optionally a nut and bolt, to secure the clamping brackets together.

5. A sleeve joint according to claim 1 wherein the at least one tensile element comprises a pair of tensile elements, each tensile element extending between each clamp.

6. A sleeve joint according to claim 2 wherein each clamp extends around and has a recess to accommodate the respective pair of shells and comprises a pair of clamping brackets one for each shell of the pair and a fastening device to secure the clamping brackets together and wherein the at least one tensile element comprises a pair of tensile elements, each tensile element extending between each clamp.

7. A sleeve joint according to claim 1 wherein each shell of each pair of sells has a wedge-shaped clamping surface and the sleeve joint comprises a pair of wedge-shaped clamping pieces for each pair of shells, each clamping piece engaging with the clamping surfaces of one of the shells.

8. A sleeve joint according to claim 1 wherein the at least one tensile element comprises a pair of tensile elements and wherein one shell of each pair of shells together with one of the tensile elements comprise one integral piece and the other shell of each pair of shells together with the other of the tensile elements comprises another integral piece.

9. A sleeve joint according to claim 7 wherein the at least one tensile element comprises a pair of tensile elements and wherein one shell of each pair of shells together with one of the tensile elements comprise one integral piece and the other shell of each pair of shells together with the other of the tensile elements comprises another integral piece.

10. A sleeve joint according to claim 7 wherein at the fluid-tight weld joint the inner jackets extend between the outer jackets and around the pipe sections ends and the fluid-tight weld between the inner jackets extends around the two outer jackets.

11. A sleeve joint according to claim 1 wherein the serrations are configured to be forced into the external surfaces of the pipe sections on tightening of the clamps.

* * * * *